United States Patent

Gersch

[11] 4,097,179
[45] * Jun. 27, 1978

[54] CUTTING TOOL HOLDER

[76] Inventor: Richard C. Gersch, 617 June Ct., Traverse City, Mich. 49684

[*] Notice: The portion of the term of this patent subsequent to Oct. 11, 1994, has been disclaimed.

[21] Appl. No.: 698,264

[22] Filed: Jun. 21, 1976

[51] Int. Cl.² ............................................. B23B 29/034
[52] U.S. Cl. ................................. 408/151; 408/714; 279/1 Q; 82/36 R
[58] Field of Search ............... 408/150, 151, 143, 714; 82/36 R, 33 A; 279/1 Q, 1 ME, 1 TE

[56] References Cited

U.S. PATENT DOCUMENTS

| 2,793,041 | 5/1957 | Barbier et al. | 82/33 A |
| 2,991,667 | 7/1961 | Williams | 408/151 |
| 3,000,240 | 9/1961 | Eckardt | 408/151 |
| 3,125,903 | 3/1964 | Briney, Jr. et al. | 408/151 |

FOREIGN PATENT DOCUMENTS 1,101,098  3/1961  Germany ......................... 408/150

Primary Examiner—Leonidas Vlachos
Attorney, Agent, or Firm—Gifford, Chandler, Vanophem, Sheridan & Sprinkle

[57] ABSTRACT

A cutting tool holder for supporting a cutting bar is provided in which the radial distance between the axis of the cutting tool holder and the cutting edge of the cutting bar is adjustable. The cutting tool holder comprises a hub member having a tubular bushing rotatably mounted in an axial bore at the outwardly extending axial end of the hub member. The inner bore of the bushing is eccentric with respect to the axis of the hub member. The cutting bar is secured to a bar holder having a shank which is received in the eccentric bore. A circular drive plate is fastened across the inner end of the bar holder and prohibits both axial and rotational movement, but permits a radial movement of the bar holder within the eccentric bore. A first tubular and cylindrical bearing sleeve, constructed of a compressible material, is disposed between the bushing and the hub member. Likewise, a second tubular and cylindrical bearing sleeve also constructed of a compressible material, is disposed in the eccentric bore between the bushing and the bar holder. The bearing sleeves facilitate the rotation of the bushing necessary to produce the radial adjustment of the cutting edge of the cutting bar. A biasing member constructed of compressible material produces engagement of portions of the cutting tool holder to frictionally retain the radial adjustment of the bushing.

21 Claims, 4 Drawing Figures

CUTTING TOOL HOLDER

BACKGROUND OF THE INVENTION

I. Field of the Invention

The present invention relates generally to a tool holder for a cutting bar in which the radial distance between the axis of the tool holder and the cutting edge of the cutting bar is adjustable and, more particularly, to such a tool holder in which the bearing sleeves and the biasing means are replaced by members constructed of a compressible material.

II. Description of the Prior Art

There have been many previously known tool holders which are particularly adapted for use in conjunction with cutting bars. These tool holders are generally of two types. With one type of tool holder the workpiece is held stationary while the tool holder is rotated about its axis. Conversely with the other type of tool holder, the tool holder is held stationary while the workpiece is rotated. Several of the previously known holders have disclosed cutting tool holders for cutting bars in which the radial distance between the axis of the holder and the cutting edge of the cutting bar is adjustable.

These previously known tool holders achieve this adjustability by means of a bushing which is rotatably mounted in an axial bore formed in the tool holder. The shank of a bar holder is received within an eccentric bore formed through the bushing. The bar holder is fixed against rotation to the tool holder so that rotation of the bushing radially moves the bar holder, and hence the cutting bar, due to the eccentricity of the inner bore of the bushing.

Previously a first sleeve of ball bearings has been disposed within the eccentric bore and between the bushing and the bar holder while a second sleeve of ball bearings is disposed in the axial bore in the tool holder between the housing of the tool holder and the bushing. The ball bearings not only prevent radial movement of the bar holder within the eccentric bore and of the bushing within the axial bore, but also permit smooth rotation of the bushing within the axial bore.

These previously known ball bearing sleeves, however, suffer several disadvantages unknown to the present invention. One disadvantage is that the ball bearing sleeves must be protected from dirt and debris by seal members or the like which require periodic replacement. However, even with seal members, dirt and debris often reach the ball bearing sleeves which necessitates cleaning and perhaps replacement of the ball bearings. Such maintenance is not only expensive to perform, but also results in down time for the cutting tool holder.

A further disadvantage of the previously known tool holders with ball bearing sleeves is that the initial cost of the ball bearing sleeves is relatively high. Moreover, the ball bearing sleeves eventually wear out and require a like wise expensive replacement.

A still further disadvantage of these previously known tool holders with ball bearing sleeves is that the ball bearing sleeves are prone to failure. Failure of the ball bearing sleeve during a cutting operation is not only likely to damage the workpiece, but also presents a serious safety hazard for the operator of the cutting machine.

These previously known cutting tool holders also employ relatively expensive spring members to bias the bar holder axially into the tool holder. The spring members frictionally retain the tool holder in its adjusted rotated position during a cutting operation.

SUMMARY OF THE PRESENT INVENTION

The cutting tool holder of the present invention obviates the above mentioned disadvantages of the previously known cutting tool holders by providing a cutting tool holder without the ball bearing sleeves and without conventional spring members, and which is not only simple in construction, but also virtually maintenance free.

In brief, the cutting tool holder of the present invention comprises a generally cylindrical hub member. A tubular and cylindrical bushing is rotatably received within an axial bore formed in the hub member and the inner bore of the bushing is eccentric with respect to the axis of the hub member. The shank of a bar holder is received within the eccentric bore and a cutting bar, in turn, is secured to the bar holder. The bar holder is secured against rotation to the hub member by a drive plate. Thus due to the eccentricity of the bushing inner bore, rotation of the bushing varies the radial distance between the axis of the tool holder and the cutting edge of the cutting bar.

In contrast to the previously known devices of this type, a first cylindrical bearing sleeve constructed of a compressible material, is interposed within the axial bore between the hub member and the bushing. A second cylindrical bearing sleeve, also constructed of a compressible material, is interposed within the eccentric bore between the bushing and the bar holder. These bearing sleeves replace the previously known ball bearing sleeves. In addition, the springs normally used in such devices to resiliently bias the bar holder axially into the hub member are also replaced by compressible members. The compressible bearing sleeves and the compressible biasing members provide a relatively inexpensive means for permitting rotation of the bushing within the hub member in order to effect the radial adjustment of the cutting bar relative to the hub member and for retaining the cutting bar in its adjusted position.

The compressible bearing sleeves achieve many advantages over the previously known ball bearing sleeves. In particular, the compressible sleeve acts as its own seal thus eliminating the need for additional seal members to protect the bearing sleeve from dirt and debris. Consequently, unlike bearing sleeves, periodic maintenance and cleaning of the compressible bearing sleeves is unnecessary.

More importantly, however, the compressible bearing sleeves as well as the compressible biasing members are virtually immune from wear and tear so that periodic replacement of the bearing sleeves and biasing members is unnecessary. Moreover, the biasing members and bearing sleeves are constructed of a relatively inexpensive material and are less costly than the previously known ball bearing sleeves and spring members.

BRIEF DESCRIPTION OF THE DRAWINGS

A better understanding of the present invention will be had upon reference to the following detailed description when read in conjunction with the accompanying drawing wherein like reference characters refer to like parts throughout the several views, and in which.

DETAILED DESCRIPTION OF THE PRESENT INVENTION

Figure 1:
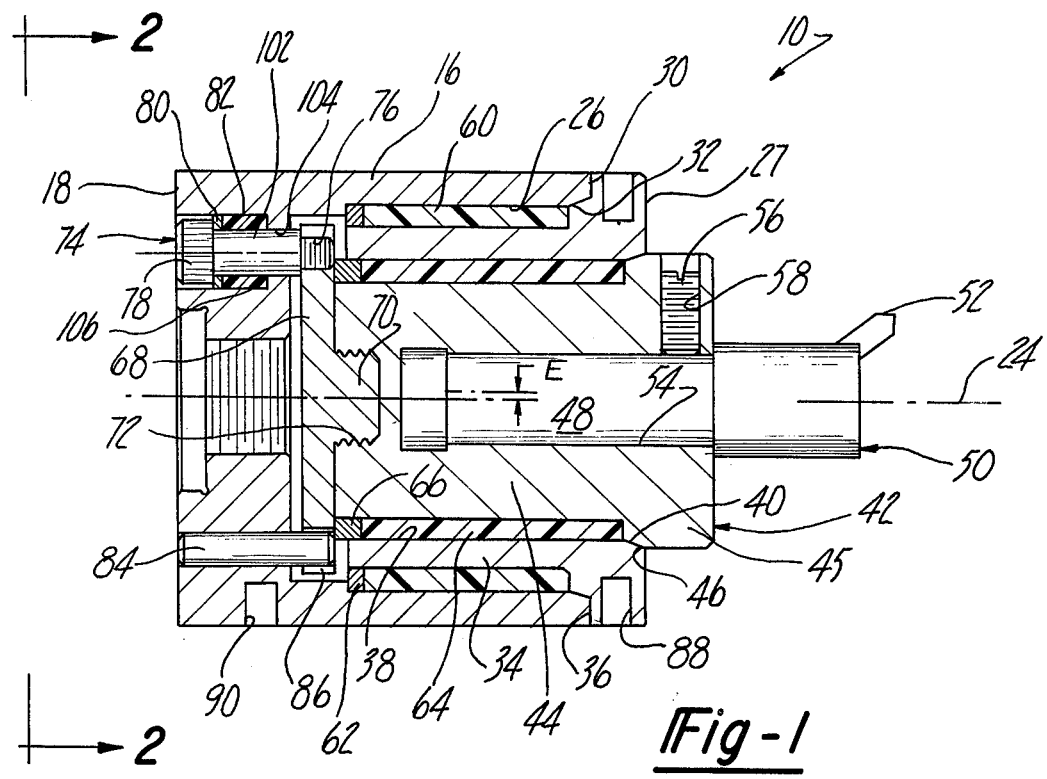
FIG. 1 is a longitudinal cross-sectional view showing one preferred embodiment of the cutting tool holder of the present invention.
Figure 2:
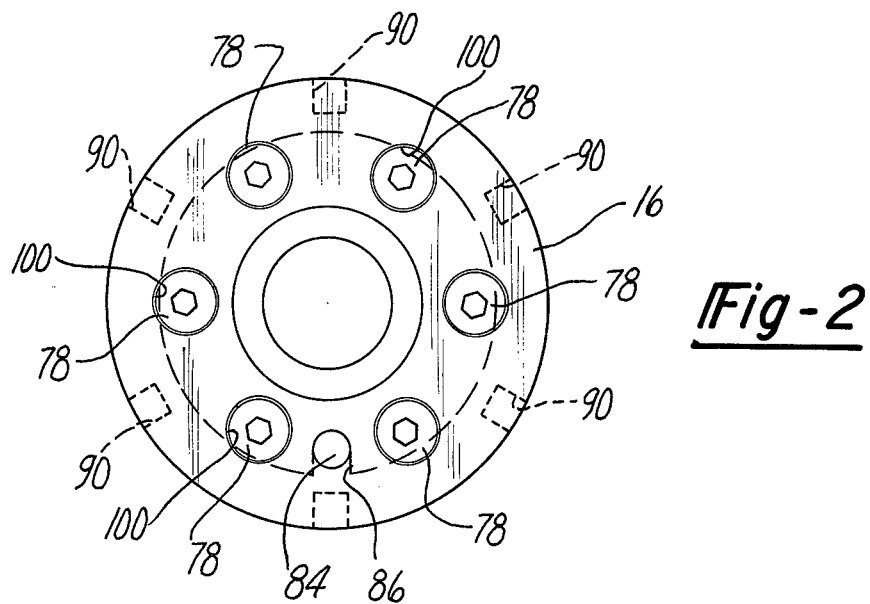
FIG. 2 is a plan view of the tool holder of the present invention taken substantially along line 2—2 in FIG. 1.

With reference to FIGS. 1 and 2, the cutting tool holder 10 of the present invention is there shown as comprising a generally cylindrical hub member 16 having an axis 24 and an inner axial end 18. The tool holder 10 shown in FIGS. 1 and 2 is conventionally known as a tool block and is adapted to be held stationary while a workpiece is rotated relative to the tool holder 10.

An axial bore 26, is machined in the outer axial end of the hub member 16, thus forming a forwardly facing abutment surface 30 on the hub member 16. In addition, the inner annular edge of the abutment surface 30 is preferably chamferred as shown at 32.

A generally cylindrical bushing 34 is disposed within the axial bore 26 and includes a flange 27 having an annular abutment surface 36 adapted to abut against the abutment surface 30 on the hub member 16 to thereby axially position the bushing 34 within the bore 26. The bushing 36 also includes an annular chamferred surface which mates with and abuts against the chamferred annular surface 32 on the hub member 16.

The bushing 34 includes an inner eccentric bore 38 therethrough. The axis of the eccentric bore 38 is parallel to but spaced from the axis 24 of the hub member 16 and this eccentricity is exaggerated and indicated at E. In addition, the outer annular edge of the eccentric bore 38 is bevelled outwardly at 40 for a purpose which will be later hereinafter described.

A generally cylindrical bar holder 42 having a shank portion 44 is provided so that the shank portion 44 fits within the eccentric bore 38. An outer annular flange 45 having a bevelled annular surface 46 on the bar holder 42 abuts against the bevelled portion 40 on the bushing 34 so that the bar holder 42 retains the bushing 34 within the hub member 16.

The shank 48 of a cutting bar 50 such as a boring bar and having a cutting edge 52 is positioned within an axial bore 54 in the bar holder 42. Any appropriate means may be used to secure the cutting bar 50 to the bar holder. However, as shown in the drawing, an Allen set screw 56 threadably engages a transverse bore 58 in the bar holder 42 so that upon tightening, the set screw 56 abuts against and locks the shank 48 of the cutting bar 50 to the bar holder 42.

A cylindrical bearing sleeve 60 constructed of a compressible material, for example, Neoprene, nylon or Teflon, is disposed within the axial bore 26 and between the hub member 16 and the bushing 34. The compressible bearing sleeve 60 is preferably elongated and extends from the chamferred surface 32 of the bushing 34 and inwardly along the length of the bushing 34. An annular spacer 62 may be provided, if desired, around the inner axial end of the bearing sleeve 60 and preferably the bearing sleeve 60 is in a state of radial compression.

A second cylindrical bearing sleeve 64 also constructed of a compressible material is disposed within the eccentric bore 38 between the bushing 34 and the shank 44 of the bar holder 42. Like the first compressible bearing sleeve 60, the second compressible bearing sleeve 64 extends from the bevelled surface 40 on the bushing 34 and inwardly along the length of the bushing 34. An annular spacer 66 may be placed, if desired, around the inner annular end of the compressible bearing sleeve 64. Also like the first bearing sleeve 60, the second bearing sleeve 64 is preferably in a state of radial compression.

A circular drive plate 68 is provided and includes an axially threaded cylindrical boss 70 which threadably engages a recess 72 in the shank 44 of the bar holder 42 to thereby secure the drive plate 68 to the bar holder 42. Any conventional means, however, may be used to secure the drive plate 68 to the bar holder 42.

A plurality of circumferentially spaced cylindrical recesses 100 are axially formed in the inner axial end 18 of the hub member 16.

A bolt member 74 having an enlarged head 78 is disposed in each recess 100 and the shank 102 of the bolt member 74 extends through an aperture 104 at the base 106 of the recess 100. Each shank 102 threadably engages an aperture 76 in the drive plate 68 to thereby secure the drive plate 68 to the hub member 16. An annular spacer 80 and a cylindrical and tubular spring member 82 constructed of a compressible material is positioned within the recess 100 and around the bolt member 74 so that the compressible spring member 82 is sandwiched in between the enlarged head 78 of the bolt member 74 and the base 106 of the recess 100. The compressible members 82 are in a state of axial compression so that the drive plate 68 with the attached bar holder 42 is resiliently retained within the eccentric bore 38. This in turn resiliently retains the bushing 34 within the axial bore 26 due to the abutting engagement of the bevelled surfaces 40 and 46 on the bushing 34 and bar holder 42, respectively. In addition, if desired, a pin 84 is disposed axially through the rear axial end 18 of the hub member 16 and is received within a slot 86 within the drive plate 68 in order to further prevent rotation of the drive plate 68 within the hub member 16.

As previously described, the compressible members 82 are compressed as the bolt members 74 are secured to the drive plate 68 so that the compressible members 82 resiliently urge the flange 27 of the bushing 34 against the outer annular surface 30 of the hub member 16. The compressible members 82 thus replace the spring members usually provided for these types of tool holders and the abutment of the bushing flange 27 with the abutment surface 30 effectively prevents the rotation of the bushing 34 once it has been rotated to its adjusted position. In addition, the resilient force from the compressible members 82 may be adjusted by changing the axial length of either the compressible members 82 or of the spacers 80.

Although any appropriate means may be used to rotate the bushing 34 in the eccentric bore 38 to thereby radially adjust the cutting edge 52 of the cutting bar 50, preferably the bushing 34 includes a plurality of radial recesses 88 with similar radial recesses 90 being formed in the hub member 16. Thus by the insertion of the proper tools within the recesses 88 and 90, the bushing 34 may be rotated in the axial bore 26. During a cutting operation, the compressive forces from the compressible bearing sleeves 60 and 64 in combination with the compressive forces from the compressible members 82 maintain a firm abutting engagement of the bushing flange 27 with the outer annular abutment surface 30 and prevent the rotation of the bushing 34 within the bore 26.

As is well known in the art, due to the eccentricity of the bore 38 and the axis of rotation 24 of the hub member 16, rotation of the bushing 34 within the axial bore 26 varies the radial distance between the axis of rotation 24 and the cutting edge 52 of the cutting bar 50. Consequently, the precise boring diameter is obtainable by merely rotating the bushing 34 within the axial bore 26 to the desired adjusted position.

Figure 3:
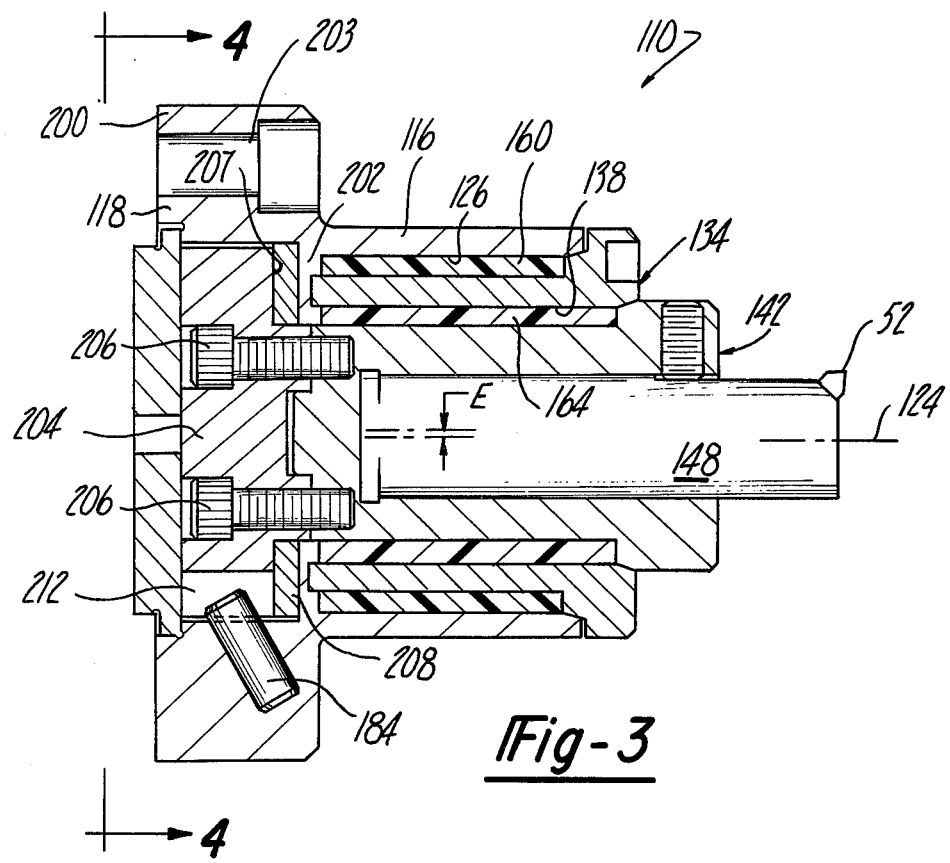
FIG. 3 is a longitudinal cross-sectional view similar to FIG. 1 but showing another preferred embodiment thereof.
Figure 4:
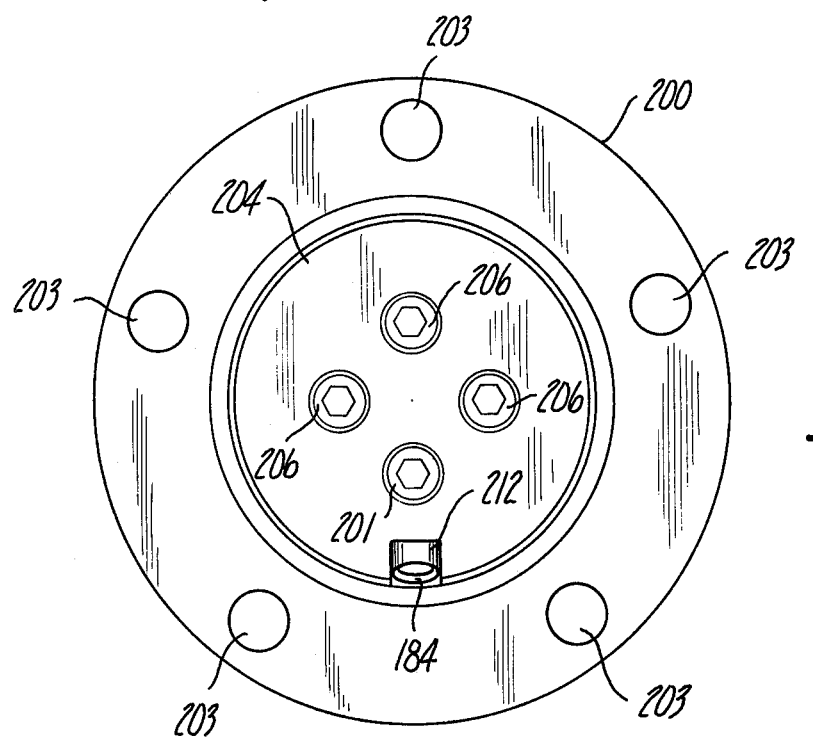
FIG. 4 is an elevational view of the tool holder of the present invention as seen substantially from line 4—4 of FIG. 3.

Another preferred embodiment of the tool holder 110 of the present invention is illustrated in FIGS. 3 and 4. In contrast to the tool holder 10 shown in FIGS. 1 and 2, the hub 116 of the tool holder 110 includes an annular mounting flange 200 adjacent the inner axial end 118 of the hub member 116. The mounting flange 200 is adapted to be secured to a rotating machine (not shown) in any conventional manner such as by fasteners (not shown) extending through bores 203 so that, upon actuation, the rotating machine rotates the hub member 116 around its axis 124 while the workpiece (not shown) is held stationary.

Still referring to FIGS. 3 and 4, the bushing 134 is rotatably mounted in the axial bore 126 in the hub member 116 while the bar holder 142 is rotatably mounted within the eccentric bore 138 in the bushing 134. The bearing sleeves 160 and 164 both of which are constructed of a compressible material are disposed respectively in the axial and eccentric bores 126 and 138 to facilitate the rotation of the bushing 134 and to thereafter retain the bushing 134 in its adjusted rotated position, as has been previously described.

The hub member 116 includes an annular flange 202 which projects radially inwardly from the axial bore 126 at the inner axial end of the bearing sleeves 160 and 164. A drive plate 204 having an annular abutment surface 207 which faces the annular flange 202 is secured to the bar holder 142 by any conventional means such as axial bolts 206. An annular member 208 constructed of a compressible material is sandwiched between the flange 202 and the annular abutment surface 207 on the drive plate 204. Preferably the annular member 208 is in a state of compression. The annular member 208 thus functions to bias the bar holder 142 axially into the hub member 116 to thereby retain the bushing 134 in its adjusted rotated position as has been previously described.

The compressible bearing sleeves facilitate the necessary rotation of the bushing between the bar holder and the hub member and achieve many advantages over the previously known ball bearing sleeves they replace. Unlike the previously known ball bearing sleeves, the compressible bearing sleeves provide a constant contact bearing surface on both sides of the bushing which is maintenance free and virtually immune from wear and tear. Moreover, unlike the previously known ball bearing sleeves, the compressible bearing sleeves cannot fail during a cutting operation thereby eliminating these previously known hazards in the machine shop. Moreover, the compressible bearing sleeves are substantially less costly than the previously known ball bearing sleeves.

The compressible biasing members are likewise less expensive than the previously known spring members which they replace and, in addition, provide a virtually maintenance free biasing means.

Having thus described my invention many modifications thereto will become apparent to those skilled in the art to which it pertains without deviation form the spirit of the invention as defined by the scope of the appended claims.

What is claimed is:

1. A cutting tool holder, comprising:
   a hub member having a mounting end and an outwardly extending end, said hub member having an axis and an axial bore formed in its outwardly extending end,
   a cylindrical bushing adapted to fit within the hub bore and having an inner bore formed therethrough eccentric to the axis of the hub member,
   a bar holder having a shank portion disposed in said eccentric bore and adapted to support a cutting bar having a cutting edge,
   means for securing said bar holder in said eccentric bore while permitting rotation of the bushing in said hub member whereby rotation of said bushing in said hub member alters the radial distance of the cutting edge of said cutting bar from said axis of said hub,
   a first tubular cylindrical bearing sleeve constructed of a compressible polymer and disposed within said hub bore between said hub member and said bushing, and
   a second tubular cylindrical bearing sleeve constructed of a compressible polymer and disposed in said eccentric bore between said bushing and the shank of said bar holder.

2. The invention as defined in claim 1, wherein said bushing includes an annular flange which abuts against an annular surface on the outwardly extending end of said hub member, wherein said means for securing said bar holder in said eccentric bore further comprises:
   a disc-shaped drive plate secured to the inner axial end of the bar holder,
   a plurality of bolt members extending through the mounting end of said hub member and threadably engaging said drive plate to thereby secure said drive plate to said hub member, and
   a cylindrical member constructed of a compressible material disposed around each bolt member and adapted to resiliently urge said drive plate toward the mounting end of said hub member.

3. The invention as defined in claim 2, wherein said cylindrical members are in a state of compression.

4. The invention as defined in claim 1, wherein said first and second bearing sleeves are in a state of radial compression.

5. The invention as defined in claim 1, wherein said bar holder includes a beveled surface adapted to abut against a bevelled surface on the radially innner and axially outwardly extending end of said bushing to thereby retain said bushing in said axial bore.

6. The invention as defined in claim 2, wherein said drive plate includes a threaded cylindrical boss which threadably engages a recess on the inner axial end of the bar holder to thereby secure said drive plate to said bar holder.

7. The invention as defined in claim 1, wherein said hub member includes an annular flange which projects radially from said axial bore at the inner axial end of said first bearing sleeve and wherein said means for securing said bar holder in said eccentric bore comprises a disc-shaped drive plate secured to the inner axial end of said bar holder and having an outer annular surface facing said annular flange, and an annular member constructed of a compressible polymer interposed between said annular flange and said annular surface on said drive plate.

8. The invention as defined in claim 7, wherein said annular member is in a state of axial compression.

9. A cutting tool holder, comprising:

a hub member having a mounting end and an outwardly extending end, said hub member having an axis and an axial bore formed in its outwardly extending end, a cylindrical bushing adapted to fit within the hub bore and having an inner bore formed therethrough eccentric to the axis of the hub member, a bar holder having a shank portion disposed in said eccentric bore and adapted to support a cutting bar having a cutting edge, means for securing said bar holder in said eccentric bore while permitting rotation of the bushing in said hub member whereby rotation of said bushing in said hub member alters the radial distance of the cutting edge of said cutting bar from said axis of said hub, a first cylindrical bearing sleeve constructed of a compressible material and disposed within said hub bore between said hub member and said bushing whereby substantially the entire outer periphery of said first bearing sleeve flatly abuts against the hub bore and whereby substantially the entire inner periphery of said first bearing sleeve flatly abuts against the outer periphery of said bushing, and a second tubular cylindrical bearing sleeve constructed of a compressible material and disposed in said eccentric bore between said bushing and the shank of said bar holder whereby substantially the entire outer periphery of said second bearing sleeve flatly abuts against the eccentric bore and whereby substantially the entire inner periphery of said second bearing sleeve flatly abuts against the outer periphery of said bar holder.

10. The invention as defined in claim 9, wherein said bushing includes an annular flange which abuts against an annular surface on the outwardly extending end of said hub member, wherein said means for securing said bar holder in said eccentric bore further comprises:

a disc-shaped drive plate secured to the inner axial end of the bar holder, a plurality of bolt members extending through the mounting end of said hub member and threadably engaging said drive plate to thereby secure said drive plate to said hub member, and a cylindrical member constructed of a compressible material disposed around each bolt member and adapted to resiliently urge said drive plate toward the mounting end of said hub member.

11. The invention as defined in claim 10, wherein said cylindrical members are in a state of compression.

12. The invention as defined in claim 9, wherein said first and second bearing sleeves are in a state of radial compression.

13. The invention as defined in claim 9, wherein said bar holder includes a bevelled surface adapted to abut against a bevelled surface on the radially inner and axially outwardly extending end of said bushing to thereby retain said bushing in said axial bore.

14. The invention as defined in claim 10, wherein said drive plate includes a threaded cylindrical boss which threadably engages a recess on the inner axial end of the bar holder to thereby secure said drive plate to said bar holder.

15. The invention as defined in claim 9, wherein said hub member includes an annular flange which projects radially from said axial bore at the inner axial end of said first bearing sleeve and wherein said means for securing said bar holder in said eccentric bore comprises:

a disc-shaped drive plate secured to the inner axial end of said bar holder and having an outer annular surface facing said annular flange, and an annular member constructed of a compressible material interposed between said annular flange and said annular surface on said drive plate.

16. The invention as defined in claim 15, wherein said annular member is in a state of axial compression.

17. A cutting tool holder, comprising:

a hub member having a mounting end and an outwardly extending end, said hub member having an axis and an axial bore formed in its outwardly extending end, a cylindrical bushing adapted to fit within the hub bore and having an inner bore formed therethrough eccentric to the axis of the hub member, a bar holder having a shank portion disposed in said eccentric bore and adapted to support a cutting bar having a cutting edge, means for securing said bar holder in said eccentric bore while permitting rotation of the bushing in said hub member whereby rotation of said bushing in said hub member alters the radial distance of the cutting edge of said cutting bar from said axis of said hub, a first cylindrical bearing sleeve constructed of a compressible material and disposed within said hub bore between said hub member and said bushing, and a second cylindrical bearing sleeve constructed of a compressible material and disposed in said eccentric bore between said bushing and the shank of said bar holder, wherein said bushing includes an annular flange which abuts against an annular surface on the outwardly extending end of said hub member and wherein said means for securing said bar holder in said eccentric bore further comprises:

a disc-shaped drive plate secured to the inner axial end of the bar holder, a plurality of bolt members extending through the mounting end of said hub member and threadably engaging said drive plate to thereby secure said drive plate to said hub member, and a cylindrical member constructed of a compressible material disposed around each bolt member and adapted to resiliently urge said drive plate toward the mounting end of said hub member.

18. The invention as defined in claim 17, wherein said cylindrical members are in a state of compression.

19. The invention as defined in claim 17, wherein said first and second bearing sleeves are in a state of compression.

20. The invention as defined in claim 17, wherein said bar holder includes a bevelled surface adapted to abut against a bevelled surface on the radially inner and axially outwardly entending end of said bushing to thereby retain said bushing in said axial bore.

21. The invention as defined in claim 17, wherein said drive plate includes a threaded cylindrical boss which threadably engages a recess on the inner axial end of the bar holder to thereby secure said drive plate to said bar holder.

* * * * *

UNITED STATES PATENT AND TRADEMARK OFFICE
CERTIFICATE OF CORRECTION

PATENT NO. : 4,097,179
DATED : June 27, 1978
INVENTOR(S) : Richard C. Gersch

It is certified that error appears in the above-identified patent and that said Letters Patent are hereby corrected as shown below:

Column 6, line 5, delete "form" and insert --from-- therefor;

Signed and Sealed this

Nineteenth Day of December 1978

[SEAL]

Attest:

RUTH C. MASON
Attesting Officer

DONALD W. BANNER
Commissioner of Patents and Trademarks